UNITED STATES PATENT OFFICE.

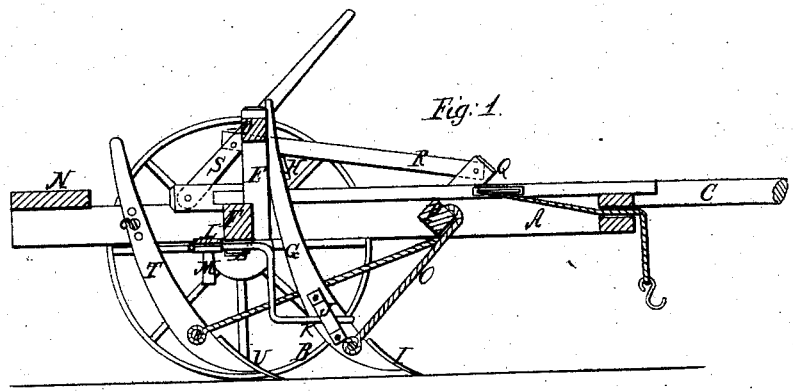
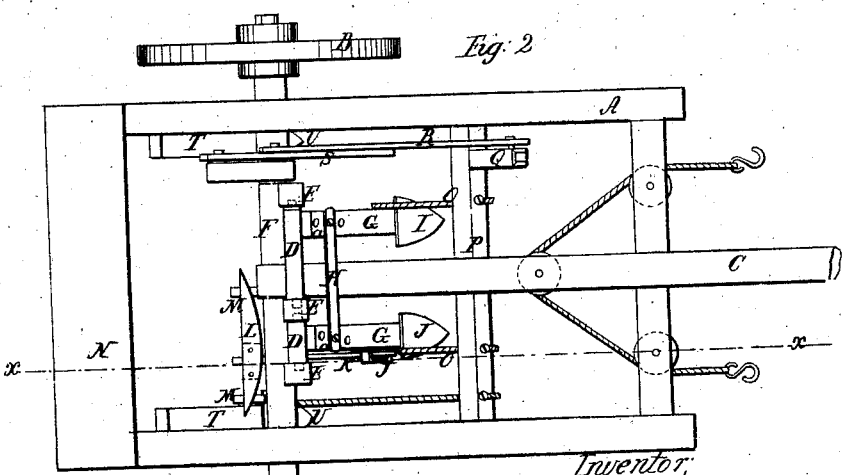

THOMAS WILES AND JAMES McGINNIS, OF MUSCATINE, IOWA.

IMPROVEMENT IN CULTIVATORS.

Specification forming part of Letters Patent No. 45,782, dated January 3, 1865.

*To all whom it may concern:*

Be it known that we, THOMAS WILES and JAMES McGINNIS, of Muscatine, in the county of Muscatine and State of Iowa, have invented a new and Improved Cultivator; and we do hereby declare that the following is a full, clear, and exact description thereof, which will enable others skilled in the art to make and use the same, reference being had to the accompanying drawings, forming part of this specification, in which—

Figure 1 is a side sectional elevation of our invention, taken in the line *x x*, Fig. 2; Fig. 3, a plan or top view of the same.

Similar letters of reference indicate like parts.

This invention relates to a new and useful improvement in that class of cultivators in which the plows that work by the sides of the rows of plants are capable of being adjusted laterally, in order that they may conform to the sinuosities of the rows.

The object of the invention is to obtain a simple and efficient device for the purpose specified, and one which may be operated by the driver with the greatest facility.

A represents a rectangular frame, which is mounted on two wheels, B B, and has a draft-pole, C, attached to it.

D D are two horizontal shafts, which are in line with each other and have their bearings in uprights E, attached to a cross, F, of frame A.

To each of these shafts D D there is attached by a pivot, *a*, a plow-standard, G, the pivots passing through the upper ends of the latter. These plow-standards are connected by a bar, H, and the lower end of each standard has a plow, I, attached to them, of the ordinary form. One of these plow-standards G has a metal loop, J, attached to its side, through which the front end of a bent rod, K, passes, said rod being fitted in a bearing, *b*, attached to the under side of the cross-bar F, and having a lever, L, secured to its back end, said lever projecting from each side of the rod and having a stirrup, M, secured to each end of it to receive the feet of the driver who is on seat N at the rear of the frame.

Each plow-standard G is connected by a cord, O, to a shaft, P, placed transversely in the frame A, and having an arm, Q, projecting from it, which arm is connected by a bar, R, to a lever, S, at the back part of the framing.

From this description it will be seen that the driver may move the plows I either to the right or left by actuating the lever L with his feet, and the plows may be made to conform perfectly to the sinuosities of the rows of plants, and said plows may also be raised up out of the earth, when required, by drawing back the lever S, which is within convenient reach of the driver.

To each side of the frame A there is attached by a pivot, *c*, a plow-standard, T, having plows U secured to their lower ends. These standards are allowed to work freely on the pivots *c*, and their lower ends are connected by cords *d* to the shaft P. It will be seen, therefore, that the plows U will be raised simultaneously with the plows I.

The plows U are designed for plowing and eradicating the weeds between the rows of plants.

We claim as new and desire to secure by Letters Patent—

The combination of the rising and falling or vertically-adjustable plows U, with the rising and falling and laterally-adjustable plows I, when the latter are pivoted to shafts D D, and connected to the shafts P, so as to rise simultaneously with the plows U on the turning of the shaft P, as and for the purpose herein set forth.

THOMAS WILES.
JAMES McGINNIS.

Witnesses:
A. F. ADAMS,
J. A. SCHREUR.